United States Patent [19]
Monta et al.

[11] Patent Number: 5,177,600
[45] Date of Patent: Jan. 5, 1993

[54] NOISE REDUCTION CIRCUIT

[75] Inventors: Hiroki Monta; Kiyoshi Imai; Atsuhisa Kageyama, all of Ibaraki, Japan

[73] Assignee: Matsushita Electric Industrial Co., Ltd., Osaka, Japan

[21] Appl. No.: 697,396

[22] Filed: May 9, 1991

[30] Foreign Application Priority Data

May 16, 1990 [JP] Japan .................. 2-127291

[51] Int. Cl.⁵ .............................. H04N 9/64
[52] U.S. Cl. ...................... 358/37; 358/36; 358/166
[58] Field of Search .............. 358/36, 16, 39, 40, 358/31, 37, 162, 166, 167, 181, 21 R

[56] References Cited

U.S. PATENT DOCUMENTS 4,355,333 10/1982 Sato ........................ 358/31
4,843,457 6/1989 Yamagata .................. 358/31
5,019,895 5/1991 Yamamoto et al. ......... 358/31
5,051,818 9/1991 Mishima .................... 358/31

OTHER PUBLICATIONS

Takahashi, "Noise Reducer", The Journal of the Institute of Television Egineers of Japan, vol. 33, No. 4, pp. 296-300, 1979.

Primary Examiner—James J. Groody
Assistant Examiner—Michael H. Lee
Attorney, Agent, or Firm—Stevens, Davis, Miller & Mosher

[57] ABSTRACT

Disclosed is a noise reduction circuit in which a YC-separated luminance signal and a YC-separated chromaticity signal are separately processed for noise reduction. In the noise reduction circuit, delay elements incorporated in a YC separation circuit are also used as delay elements in a contour correction circuit so as to attain the desired purpose of noise reduction in both the luminance signal and the chromaticity signal and also the desired purpose of contour correction. Thus, both the noise reduction and the contour correction can be achieved by the noise reduction circuit which is simple in structure and inexpensive.

3 Claims, 4 Drawing Sheets

NOISE REDUCTION CIRCUIT

BACKGROUND OF THE INVENTION

This invention relates to a noise reduction circuit which is incorporated in, for example, a television receiver and in which delay elements are used so as to reduce white noise included in a composite picture signal or in a luminance signal and a chromaticity signal obtained as a result of YC separation of a composite picture signal.

In IDTV (Improved Television) in which television pictures of a high quality are demanded, a noise reduction circuit has been put into practical use so as to achieve one of indispensable functions of the IDTV. In the IDTV, a composite picture signal is not directly processed but is separated into a luminance signal and a chromaticity signal (referred to hereinafter as YC separation), and these signals are separately processed so as to reproduce a picture of a high quality. In the noise reduction circuit too, the luminance signal and the chromaticity signal obtained as a result of the YC separation are separately processed for the purpose of noise reduction. In the case of the IDTV, it is customary to employ a noise reduction circuit of recursive type utilizing delay elements provided in an IDTV receiver. A prior art noise reduction circuit of recursive type utilizing such delay elements is disclosed in, for example, "Noise Reducer, Takahashi, The Journal of The Institute of Television Engineers of Japan, Vol. 33, No. 4, (1979), pp. 296-300.

Examples of a prior art YC separation circuit and prior art noise reduction circuits will now be described by reference to FIGS. 1, 2 and 3.

FIG. 1 is a block diagram of the prior art YC separation circuit. Referring to FIG. 1, the prior art YC separation circuit includes an input terminal 1 for a composite picture signal, delay elements 4 and 5 for delaying the input composite picture signal by a predetermined period of time respectively, an adder 6 adding the output signal of the delay element 5 to the composite picture signal applied to the input terminal 1, a factor-of-$\frac{1}{2}$ multiplier circuit 7 multiplying the output signal of the adder 6 by the factor of $\frac{1}{2}$, a subtracter 8 subtracting the output signal of the factor-of-$\frac{1}{2}$ multiplier circuit 7 from the output signal of the delay element 4, a factor-of-$\frac{1}{2}$ multiplier circuit 9 multiplying the output signal of the subtracter 8 by the factor of $\frac{1}{2}$, a band-pass filter 10 extracting a chromaticity signal component from the composite picture signal, a subtracter 12 subtracting the output signal of the band-pass filter 10 from the output signal of the delay element 4, a chromaticity signal output terminal 31 connected to the output terminal of the band-pass filter 10, and a luminance signal output terminal 32 connected to the output terminal of the subtracter 12.

FIGS. 2 and 3 show the examples of the prior art noise reduction circuits. That is, FIG. 2 is a block diagram of the prior art noise reduction circuit for the luminance signal, and FIG. 3 is a block diagram of the prior art noise reduction circuit for the chromaticity signal.

Referring to FIG. 2, the noise reduction circuit includes a luminance signal input terminal 33, a subtracter 16 subtracting the input luminance signal from the output signal of a delay element 17, a factor-of-K multiplier circuit 18 multiplying the output signal of the subtracter 16 by the factor of K, an adder 19 adding the input luminance signal to the output signal of the factor-of-K multiplier circuit 18, and an output terminal 20 for the noise-reduced luminance signal.

Referring to FIG. 3, the noise reduction circuit includes a chromaticity signal input terminal 34, a subtracter 24 subtracting the input chromaticity signal from the output signal of an inverter 25 which inverts the output signal of a delay element 26, a factor-of-K multiplier circuit 27 multiplying the output signal of the subtracter 24 by the factor of K, an adder 28 adding the input chromaticity signal to the output signal of the factor-of-K multiplier circuit 27, and an output terminal 30 for the noise-reduced chromaticity signal.

The operations of the YC separation circuit and the noise reduction circuits having the structures described above will now be described.

The YC separation circuit shown in FIG. 1 utilizes the fact that the phase of a chromaticity component of a composite picture signal inverts in alternate frame or line periods. Referring to FIG. 1, the chromaticity component is cancelled in the adder 6 and roughly extracted in the subtracter 8. Finally, the chromaticity component is extracted in the band-pass filter 10 and appears at the chromaticity signal output terminal 31. On the other hand, the luminance component is obtained when the chromaticity component extracted in the manner described above is subtracted in the subtracter 12 from the composite picture signal. The luminance component thus obtained appears at the luminance signal output terminal 32. Then, in the noise reduction circuits shown in FIGS. 2 and 3, the S/N ratio is improved, utilizing the fact that there is a very strong autocorrelation between picture information supplied in one frame or line period and that supplied in the preceding frame or line period and that, in the case of random noise, the energy only of the noise component is lowered when the result of addition of the random noise appearing in those periods is averaged.

In the noise reduction circuit shown in FIG. 2, the luminance signal applied to the input terminal 33 in one period is subtracted in the subtracter 16 from the luminance signal which has been applied in the preceding period and in which the noise has been reduced, and the noise component appears at the output of the subtracter 16. The combination of the factor-of-K multiplier circuit 18 and the adder 19 averages the noise components appearing from the subtracter 16 in those periods thereby reducing the noise, and the noise-reduced luminance signal appears at the luminance signal output terminal 20. In the noise reduction circuit shown in FIG. 3, the inverter 25 is used to reduce noise in the chromaticity signal whose phase inverts in predetermined alternate periods. Thus, the noise in the chromaticity signal is reduced as in the case of the noise reduction in the luminance signal, and the noise-reduced chromaticity signal appears at the chromaticity signal output terminal 30.

In the manner described above, the noise-reduced luminance signal and the noise-reduced chromaticity signal can be extracted from the input composite picture signal.

SUMMARY OF THE INVENTION

However, the prior art noise reduction circuits having the structures described above have had the problem that the edge of a picture tends to become indistinct due to the averaging for the purpose of noise reduction, with the result that a picture of a high quality having a distinctly defined contour cannot be reproduced. Although the picture quality at the contour can be improved by carrying out processing such as contour correction in a stage before or after the noise reduction circuits, it is necessary to increase the number of delay elements so as to attain the improvement, and other problems such as an increased cost and an increased delay arise inevitably.

With a view to solve the prior art problems described above, it is an object of the present invention to provide a noise reduction circuit which achieves the contour correction by utilization of delay elements incorporated in a YC separation circuit thereby improving the picture quality at the contour part without increasing the number of delay elements.

An embodiment of the noise reduction circuit of the present invention which solves the prior art problems comprises: a luminance signal/chromaticity signal separation circuit including delay elements, an adder, a subtracter and a band-pass filter for separating an input composite picture signal into a luminance component and a chromaticity component and having a first output terminal and a second output terminal for generating a chromaticity signal and a luminance signal as its outputs respectively; contour correcting means receiving, as one of its inputs, the luminance signal generated from the luminance signal/chromaticity signal separation circuit and, as the other input, the signal component appearing from the subtracter after passing through the delay elements in the luminance signal/chromaticity signal separation circuit, and, after passing the signal component through a low-pass filter, adding the output signal of the low-pass filter to the luminance signal thereby achieving the contour correction; first noise reducing means receiving, as its input, the output signal of the adder in the contour correcting means and, after reducing a noise component in the input signal by the combination of a delay element, an adder, a subtracter and a factor-of-K multiplier circuit, generating the noise-reduced luminance signal from its output terminal; and second noise reducing means receiving, as its input, the chromaticity signal generated from the luminance signal/chromaticity signal separation circuit and, after reducing a noise component in the input signal by the combination of a delay element, an adder, a subtracter and an inverter, generating the noise-reduced chromaticity signal from its output terminal.

The noise reduction circuit of the present invention having the structure described above can improve the quality at the contour part of a picture and can also reduce noise in a picture signal without the necessity for increasing the number of delay elements. Further, by the use of four switching circuits operating in interlocking relation in response to a control signal applied for controlling an input picture signal, no relative delay occurs between the luminance signal and the chromaticity signal generated from the noise reduction circuit regardless of whether the input signal is a composite picture signal or a YC-separated signal.

DESCRIPTION OF THE PREFERRED EMBODIMENTS

Preferred embodiments of the noise reduction circuit according to the present invention will now be described in detail by reference to the drawings.

Figure 1:
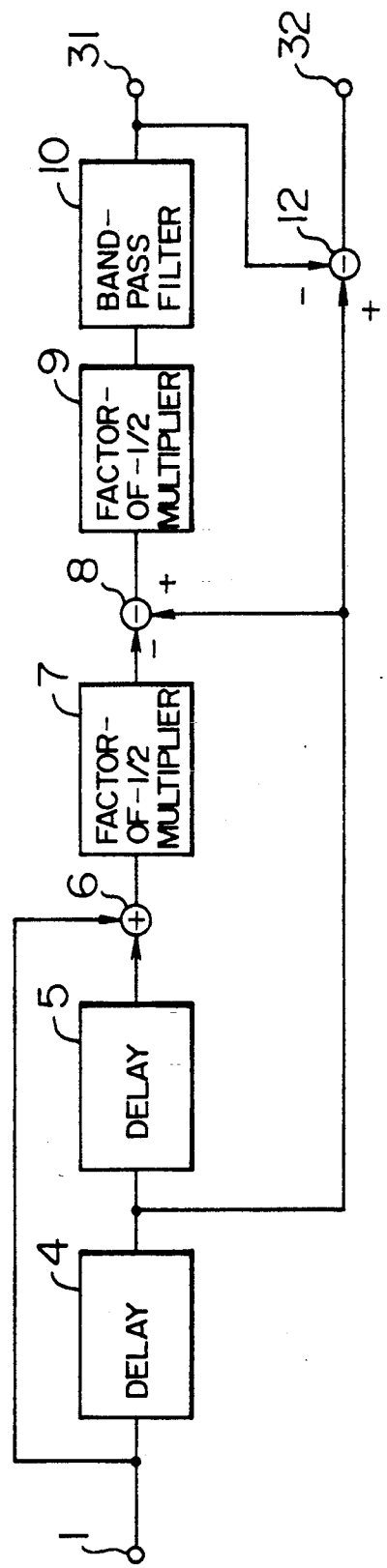
FIG. 1 is a block diagram of a prior art YC separation circuit.
Figure 2:
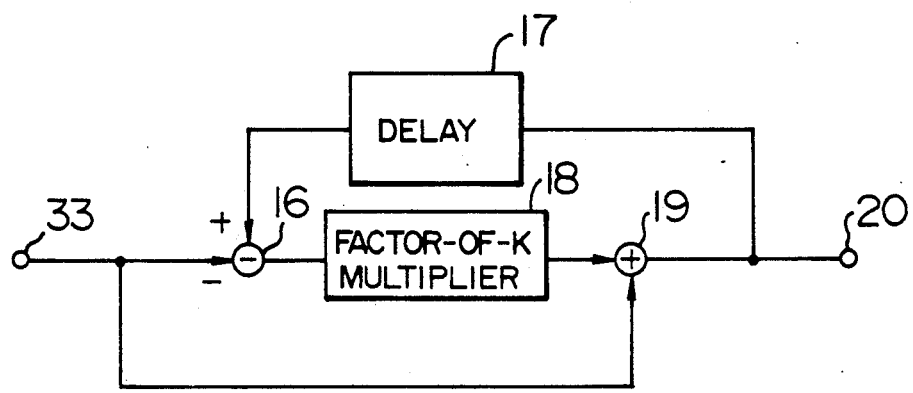
FIG. 2 is a block diagram of a prior art noise reduction circuit for a luminance signal.
Figure 3:
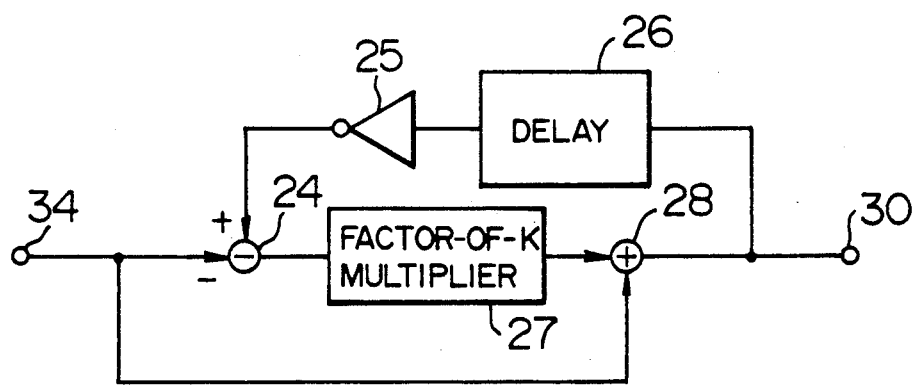
FIG. 3 is a block diagram of a prior art noise reduction circuit for a chromaticity signal.
Figure 4:
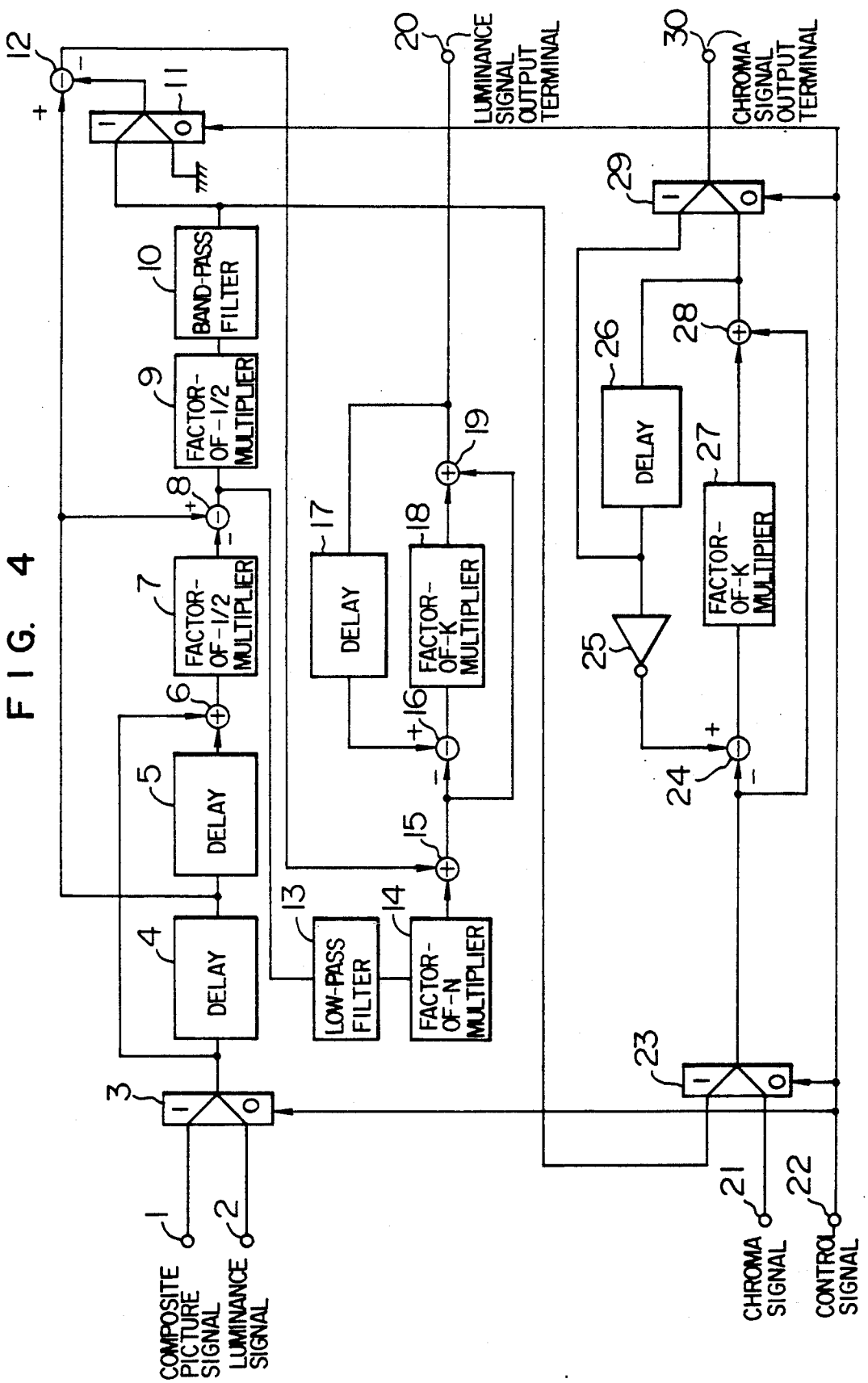
FIG. 4 is a block diagram of an embodiment of the noise reduction circuit according to the present invention.

FIG. 4 is a block diagram of an embodiment of the noise reduction circuit of the present invention, and, in FIG. 4, like reference numerals are used to designate like parts appearing in FIGS. 1, 2 and 3. Referring to FIG. 4, the noise reduction circuit includes an input terminal 1 for a composite picture signal, an input terminal 2 for a YC-separated luminance signal, a first switching circuit 3 selecting one of the composite picture signal and the luminance signal in response to a picture input control signal applied to an input terminal 22, a first and a second delay element 4 and 5, a first adder 6 adding the output signal of the delay element 5 to the output signal of the switching circuit 3, a first factor-of-$\frac{1}{2}$ multiplier circuit 7 multiplying the output signal of the adder 6 by the factor of $\frac{1}{2}$, a first subtracter 8 subtracting the output signal of the factor-of-$\frac{1}{2}$ multiplier circuit 7 from the output signal of the delay element 4, a second factor-of-$\frac{1}{2}$ multiplier circuit 9 multiplying the output signal of the subtracter 8 by the factor of $\frac{1}{2}$, a band-pass filter 10 extracting a chromaticity signal component, a second switching circuit 11 applying the output signal of the band-pass filter 10 or a "0" to a second subtracter 12 in response to the picture input control signal applied to the input terminal 22, the second subtracter 12 subtracting the output signal of the switching circuit 11 from the output signal of the delay element 4, a low-pass filter 13 connected to the output terminal of the subtracter 8, a factor-of-N multiplier circuit 14 multiplying the output signal of the low-pass filter 13 by the factor of N ($0 \leq N \leq \frac{1}{4}$), a third adder 15 adding the output signal of the factor-of-N multiplier circuit 14 to the output signal of the subtracter 12, a third subtracter 16 subtracting the output signal of the adder 15 from the output signal of a third delay element 17, a first factor-of-K multiplier circuit 18 multiplying the output signal of the subtracter by the factor of K ($0 \leq K \leq \frac{1}{2}$), a fourth adder 19 adding the output signal of the adder 15 to the output signal of the factor-of-K multiplier circuit 18, an output terminal 20 for a noise-reduced luminance signal, an input terminal 21 for a YC-separated chromaticity signal, a third switching circuit 23 selecting one of the output signal of the band-pass filter 10 and the chromaticity signal applied to the input terminal 21 in response to the picture input control signal applied to the input terminal 22, a fourth subtracter 24 subtracting the output signal of an inverter 25, which inverts the output signal of a fourth delay element 26, from the output signal of the switching circuit 23, a second factor-of-K multiplier circuit 27 multiplying the output signal of the subtracter 24 by the factor of K, a fifth adder 28 adding the output signal of the factor-of-K multiplier circuit 27 to the output signal of the switching circuit 23, a fourth switching circuit 29 selecting one of the output signal of the adder 28 and the output signal of the delay element 26 in response to the picture input control signal applied to the input terminal 22, and an output terminal 30 for a noise-reduced chromaticity signal. The four switching circuits 3, 11, 23, and 29 are switched over by the picture input control signal applied to the input terminal 22, as described above.

The operation of the noise reduction circuit having the structure described above will now be described. The noise reduction circuit according to the present invention is featured in that the prior art YC separation circuit, the prior art noise reduction circuit for the luminance signal and the prior art noise reduction circuit for the chromaticity signal are combined together, and the combination of the low-pass filter 13 and the factor-of-N multiplier circuit 14 for achieving the picture contour correction is added to the combination of the prior art circuits.

Figure 5:
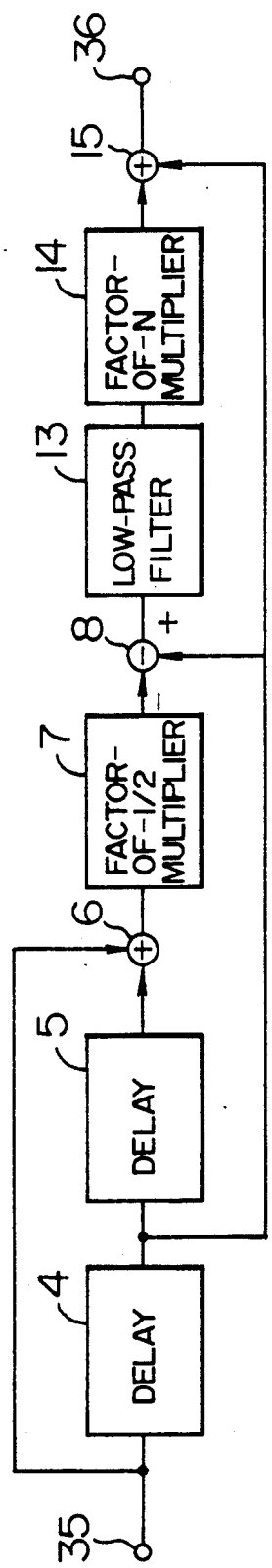
FIG. 5 is a block diagram of a contour correction circuit.

FIG. 5 is a block diagram of such a contour correction circuit in the case where the picture input control signal causes second switch 11 to select its "0" input.

Referring to FIG. 5, the contour correction circuit consists of a picture signal input terminal 35, the delay elements 4 and 5, the adder 6 adding the output signal of the delay element 5 to a picture signal applied to the input terminal 35, the factor-of-$\frac{1}{2}$ multiplier circuit 7 multiplying the output signal of the adder by the factor of $\frac{1}{2}$, the subtracter 8 subtracting the output signal of the factor-of-$\frac{1}{2}$ multiplier circuit 7 from the output signal of the delay element 4, the low-pass filter 13, the factor-of-N multiplier circuit 14 multiplying the output signal of the low-pass filter 13 by the factor of N, the adder 15 adding the output signal of the factor-of-N multiplier circuit 14 to the output signal of the delay element 4, and an output terminal 36 for the picture signal subjected to the contour correction.

The operation of the contour correction circuit having the structure described above will now be described. In FIG. 5, the output signal of the subtracter 8 is the contour component of the input picture signal, and, when the output signal of the subtracter 8 is passed through the low-pass filter 13, noise included in the contour component of the picture signal is reduced somewhat. Then, when the output signal of the low-pass filter 13 is multiplied by the factor of N by the factor-of-N multiplier circuit 14, and the output signal of the factor-of-N multiplier circuit 14 is added in the adder 15 to the output signal of the delay element 4, the contour component of the picture signal is corrected, and the picture signal subjected to the contour correction appears at the output terminal 36. It will be seen in FIG. 5 that the two delay elements 4 and 5 in the YC separation circuit are used also as the two delay elements in the contour correction circuit, so that the contour correction can be achieved without increasing the number of the delay elements.

In FIG. 4, one of the YC-separated luminance signal applied to the input terminal 2 and the composite picture signal applied to the input terminal 1 is selected by the switching circuit 3 so that the same manner of contour correction can be made for any one of these input signals. When the input signal selected by the switching circuit 3 is the YC-separated luminance signal applied to the input terminal 2, extraction of the chromaticity component is unnecessary, and the switching circuit 11 acts to select the "0" signal. The switching circuit 23 acts to select the YC-separated chromaticity signal when the switching circuit 3 selects the YC-separated luminance signal. The switching circuit 29 acts so that the amount of delay of the luminance signal is the same as that of the chromaticity signal when the YC-separated chromaticity signal is applied to the input terminal 21 and the YC-separated luminance signal is applied to the input terminal 2 at the same time. These four switching circuits 3, 11, 23, and 29 are arranged to operate in interlocking relation in response to the picture input control signal applied to the input terminal 22.

It will be understood from the foregoing detailed description that the present invention provides a noise reduction circuit comprising: a luminance signal/chromaticity signal separation circuit including delay elements, an adder, a subtracter and a band-pass filter for separating an input composite picture signal into a luminance component and a chromaticity component and having a first output terminal and a second output terminal for generating a chromaticity signal and a luminance signal as its outputs respectively; contour correcting means receiving, as one of its inputs, the luminance signal generated from the luminance signal/chromaticity signal separation circuit and, as the other input, the signal component appearing from the subtracter after passing through the delay elements in the luminance signal/chromaticity signal separation circuit, and, after passing the signal component through a low-pass filter, adding the output signal of the low-pass filter in an adder to the luminance signal thereby achieving the contour correction; first noise reducing means, receiving as its input, the output signal of the adder in the contour correcting means and, after reducing a noise component in the input signal by the combination of a delay element, an adder, a subtracter and a factor-of-K multiplier circuit, generating the noise-reduced luminance signal from its output terminal; and second noise reducing means receiving, as its input, the chromaticity signal from the luminance signal/chromaticity signal separation circuit, and, after reducing a noise component in the input signal by the combination of a delay element, an adder, a subtracter and an inverter, generating the noise-reduced chromaticity signal from its output terminal. The noise reduction circuit of the present invention can improve the quality at the contour part of a picture without the necessity for increasing the number of delay elements. Further, by the use of four switching circuits operating in interlocking relation in response to the application of a picture input control signal, no relative delay occurs between the luminance signal and the chromaticity signal generated from the noise reduction circuit regardless of whether the input signal is a composite picture signal or a YC-separated signal.

We claim:
1. A noise reduction circuit comprising:
   a luminance signal/chromaticity signal separation circuit including delay elements, an adder, a subtracter and a band-pass filter for separating an input composite picture signal into a luminance component and a chromaticity component and having a first output terminal and a second output terminal for generating a chromaticity signal and a luminance signal as its output respectively;
   contour correcting means receiving, as one of its inputs, the luminance signal generated from said luminance signal/chromaticity signal separation circuit and, as the other input, the signal component appearing from said subtracter after passing through said delay elements in said luminance signal/chromaticity signal separation circuit, and, after passing the signal component through a low-pass filter, adding the output signal of said low-pass filter to said luminance signal thereby achieving the contour correction;

first noise reducing means receiving, as its input, the output signal of said adder in said contour correcting means and, after reducing a noise component in the input signal by the combination of a delay element, an adder, a subtracter and a factor-of-K multiplier circuit ($0 \leq K \leq \frac{1}{2}$), generating the noise-reduced luminance signal from its output terminal; and second noise reducing means receiving, as its input, the chromaticity signal generated from said luminance signal/chromaticity signal separation circuit, and, after reducing a noise component in the input signal by the combination of a delay element, an adder, a subtracter, a factor-of-K multiplier circuit ($0 \leq K \leq \frac{1}{2}$) and an inverter, generating the noise-reduced chromaticity signal from its output terminal.

2. A noise reduction circuit comprising:

a first switching circuit receiving a composite picture signal and a YC-separated luminance signal as its inputs and selectively generating one of the input signals as its output;

a luminance signal/chromaticity signal separation circuit receiving the output signal of said first switching circuit as its input and including at least a delay element, an adder, a subtracter and a band-pass filter for separating a chromaticity signal from a luminance signal;

a second switching circuit receiving the output signal of said band-pass filter and a reference potential signal as its inputs and selectively generating one of the input signals as its output;

contour correcting means receiving, as one of its inputs, the luminance signal obtained by subtracting the output signal of said second switching circuit from the output signal of said delay element and, as the other input, the signal component appearing from said subtracter after passing through said delay element, and, after passing the signal component through a low-pass filter, adding the output signal of said low-pass filter in an adder to said luminance signal thereby achieving the contour correction;

first noise reducing means receiving, as its input, the output signal of said adder in said contour correcting means and, after reducing a noise component in the input signal by the combination of a delay element, an adder, a subtracter and a factor-of-K multiplier circuit ($0 \leq K \leq \frac{1}{2}$), generating the noise-reduced luminance signal from its output terminal;

a third switching circuit receiving, as one of its inputs, the chromaticity signal generated from said luminance signal/chromaticity signal separation circuit and, as the other input, a YC-separated chromaticity signal and selectively generating one of the input signals as its output;

second noise reducing means receiving, as its input, the chromaticity signal generated from said third switching circuit and reducing a noise component the input signal by the combination of a delay element, an adder, a subtracter, and a factor-of-K multiplier circuit ($0 \leq K \leq \frac{1}{2}$); and a fourth switching circuit receiving, as one of its inputs, the chromaticity signal appearing from the output terminal of said adder in said second noise reducing means and, as the other input, the chromaticity signal appearing from said delay element in said second noise reducing means and selectively generating one of the input signals as its output, said first, second, third and fourth switching circuits being switched over in interlocking relation.

3. A noise reduction circuit comprising:

an input terminal for a composite picture signal;

an input terminal for a YC-separated luminance signal;

a first switching circuit selecting one of these input signals in response to the application of a picture input control signal;

a first delay element connected to the output terminal of said first switching circuit so as to delay the output signal of said first switching circuit by a predetermined period of time;

a second delay element connected to said first delay element;

a first adder adding the input signal of said first delay element to the output signal of said second delay element;

a factor-of-$\frac{1}{2}$ multiplier circuit multiplying the output signal of said first adder by the factor of $\frac{1}{2}$;

a first subtracter subtracting the output signal of said factor-of-$\frac{1}{2}$ multiplier circuit from the output signal of said first delay element;

a second factor-of-$\frac{1}{2}$ multiplier circuit multiplying the output signal of said first subtracter by the factor-of-$\frac{1}{2}$;

a band-pass filter connected to the output terminal of said second factor-of-$\frac{1}{2}$ multiplier circuit;

a second switching circuit selecting one of the output signal of said band-pass filter and a "0" input signal in response to the application of said picture input control signal;

a second subtracter subtracting the output signal of said second switching circuit from the output signal of said first delay element;

a low-pass filter connected to the output terminal of said second subtracter;

a factor-of-N multiplier circuit connected to the output terminal of said low-pass filter for multiplying the output signal of said low-pass filter by the factor of N ($0 \leq N \leq \frac{1}{4}$);

a second adder adding the output signal of said factor-of-N multiplier circuit to the output signal of said first subtractor;

a third subtracter subtracting the output signal of said second adder from the output signal of a third delay element;

a first factor-of-K multiplier circuit multiplying the output signal of said third subtracter by the factor-of-K ($0 \leq K \leq \frac{1}{2}$);

a third adder adding the output signal of said second adder to the output signal of said factor-of-K multiplier circuit;

a third delay element connected to the output terminal of said third adder;

an output terminal connected to the output terminal of said third adder so as to generate the noise-reduced luminance signal therefrom;

an input terminal for a YC-separated chromaticity signal;

a third switching circuit selecting one of the output signal of said band-pass filter and the YC-separated chromaticity signal in response to the application of said picture input control signal;

a fourth subtracter subtracting the output signal of an inverter connected to the output terminal of a fourth delay element from the output signal of said third switching circuit;

a second factor-of-K multiplier circuit multiplying the output signal of said fourth subtracter by the factor of K;

a fourth adder adding the output signal of said third switching circuit to the output signal of said second factor-of-K multiplier circuit;

a fourth delay element connected to the output terminal of said fourth adder;

a fourth switching circuit selecting one of the output signal of said fourth delay element and the output signal of said fourth adder in response to the application of said picture input control signal; and an output terminal connected to the output terminal of said fourth switching circuit so as to generate the noise-reduced chromaticity signal therefrom.

* * * * *